United States Patent Office 2,814,568
Patented Nov. 26, 1957

2,814,568
REFRACTORY COMPOSITIONS

Edward P. Pearson and Samuel Rusoff, Tiffin, Ohio, assignors to Basic, Incorporated, a corporation of Ohio No Drawing. Application October 14, 1953,
Serial No. 386,127

11 Claims. (Cl. 106—62)

The bonding of refractory particles together as past practiced quite commonly involved the inclusion of sodium silicate. While this forms a bond, it has the great drawback of reducing the refractoriness of the mass, and this limitation can be quite serious in many instances. A refractory affording suitable initial bonding, without such associated loss of refractoriness has therefore been much sought. In accordance with the present invention, an effective bonding may now be had with preservation of desired refractoriness and over-all advantageous results. Other objects and advantages will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

We have found that magnesium oxide with sodium phospho-aluminate yields an excellent bond. The magnesium oxide may be any of the dead-burned grades as now available, such as prepared by the high temperature calcination (2900° F. or higher) of natural magnesites, with such contained impurities as act as burning agents; or synthetic magnesium hydroxide or carbonate to which have been added burning agents, such as silicon or iron oxides, may be employed. These magnesias may be derived from sea water, or from magnesium minerals, such as dolomite, by chemical or physical processing. And of course pure magnesium oxide may be used, provided it has been calcined to 2900° F. or higher. We have found that magnesium oxide prepared at lower temperatures does not give a satisfactory bond. While the reason for this is not clear, it is suspended that it is because of such a rapid reaction with the other bond ingredients, that the setting action takes place during the mixing of plastic refractory with tempering water and during placement, rather than after placement with the more proper slow type of reaction which occurs with a completely burned magnesia. The sodium phospho-aluminate of commerce consists essentially of $Na_2O$ 44.5 percent, $Al_2O_3$ 43.5 percent, and $P_2O_5$ 8.5 percent. It is a double salt of sodium aluminate and sodium ortho-phosphate, and is used in essentially anhydrous state. It is best ground with the other ingredients of the refractory to give a fine fraction which is then blended with the coarser particles which are to make up the refractory. Along with the sodium phospho-aluminate, we apply trisodium orthophosphate. Desirably also sodium carbonate is added, as it is found that its addition results in a somewhat better bond, and it helps to control the setting action and also seems to have some function against ionic migration. Thus, for a bond there is involved magnesium oxide, such as dead-burned magnesia, and with this sodium phospho-aluminate in amount 0.50 to 10.00 parts, trisodium orthophosphate 0.25 to 1.25 parts, and preferably with the addition of sodium carbonate 0.50 to 2.50 parts, all by weight. For the bond composition itself, with the aforesaid amounts of sodium phospho-aluminate, etc., the magnesia will proportion about 86.25 to 98.75 parts by weight.

With this bond there will be included granular refractory material as desired in any given case, such as suitably sized dead-burned magnesia, chrome ore, silica (ganister or sandstone), calcined fire clay, silicon carbide, alumina, etc. It will be understood that the magnesia for the bond component is very finely ground as compared with the refractory particles otherwise included with the bond for final composition. Thus, the bonding magnesia is desirably ground to a fineness at least 50% —200 mesh, U. S. standard. And finer grinding is permissible, if desired. While the respective bonding agents can be ground individually, a desirable practice is to mix them with a portion of a magnesia and grind all together. Or in some cases, the bonding ingredients can be ground together to approximately minus 30 mesh, U. S. standard, and then be mixed into the refractory batch. However, as sodium phospho-aluminate is hygroscopic, it tends to take up moisture from the atmosphere during grinding and thus cake somewhat so as to not disperse readily through the remainder of the refractory mixture. For such reason, it is in general most advantageous to grind the bonding agents with a portion of the refractory base.

The bonding material as indicated, is mixed with the sized refractory particles which are to make up the product, and tempered with water to the desired consistency, and then formed into the desired shape by usual means. On standing, the mixture sets at room temperature by chemical reaction to a well-bonded mass. The strength can be further increased by heating 2 to 24 hours at temperatures up to about 265° F.

The trisodium orthophosphate may be any of the commercial grades, containing varying amounts of water of crystallization. However, the dodeca-hydrate, $$Na_3PO_4 \cdot 12H_2O$$

is particularly advantageous, being of lesser cost, and is entirely satisfactory. The sodium carbonate may be the anhydrous soda ash of commerce containing at least 58% $Na_2O$. This may be in either the light or dense form, and it is also best ground into the bonding fraction of the mix.

In general, good bonding is obtained in refractory mixes containing 20–40 percent of the bonding material, i. e., a blend of dead-burned magnesia, sodium phospho-aluminate and the bond promoters, trisodium orthophosphate and sodium carbonate.

Examples illustrative of such refractory mixes are as follows:

(1) A mixture was made in dry state of dead-burned magnesia (65% through 200 mesh) 18.75 parts, sodium phospho-aluminate (through 30 mesh) 0.50 part, trisodium phosphate (through 30 mesh) 0.25 part, sodium carbonate (through 30 mesh) .50 part, and chrome ore (—6+20 mesh) 60.00 parts, and chrome ore (65% through 200 mesh) 20.00 parts. All these being by weight, and the mesh being U. S. standard. The mixture was tempered with an additional 5.4% of water. Test portions taken from this and molded by ramming in a sand ramming test machine by 20 strokes into cylinders 2 inches in diameter by 2 inches high, formed pieces which were dried at 250° F. for 24 hours, cooled to room temperature, and finally tested for compressive strength at this temperature. The average strength for four test pieces was in excess of 2,000 pounds per square inch.

(2) A mixture was prepared of dead-burned magnesia (65% through 20 mesh) 38.7 parts, sodium phospho-aluminate (through 30 mesh) 0.5 part, trisodium phosphate (through 30 mesh) 0.3 part, sodium carbonate (through 30 mesh) 0.5 part, and chrome ore (—5+20 mesh) 60 parts, all by weight. The materials were mixed dry, and then tempered with an addition of 6% of water. Test pieces from this were molded by ramming as in Example 1, and after being dried at 250° F. for 24 hours, were tested for compressive strength at various temperatures. Each test piece was held at the test temperature for one hour prior to crushing. The results for the average of four individual test pieces at each temperature were as follows:

| Test temperature: | Compressive strength, p. s. i. |
|---|---|
| 70° F | In excess of 2000 |
| 1000° F | 1257 |
| 1500° F | 156 |
| 2000° F | 282 |
| 2250° F | 544 |

(3) The following materials were dry mixed in amounts, 99% alumina brick grog (—4+20 mesh) 60 parts, dead-burned magnesia (65% through 200 mesh) 33.75 parts, sodium phospho-aluminate (through 30 mesh) 2.50 parts, trisodium phosphate (through 30 mesh) 1.25 parts, sodium carbonate (through 30 mesh) 2.50 parts, all by weight. The dry mixture was tempered by additional 7.5% of water. Test cylinders 2 inches in diameter by 2 inches high were prepared from this mixture by ramming as above described, and the test pieces were dried at 250° F. for 24 hours, and the compressive strength was then determined at various temperatures, the test pieces being held at the specified temperature for one hour prior to testing. The results were as follows:

| Test temperature: | Compressive strength, p. s. i. |
|---|---|
| 70° F | 3595 |
| 1000° F | 1296 |
| 1500° F | 273 |
| 2000° F | 798 |

(4) A magnesia ramming material was prepared by dry mixing the ingredients: dead-burned magnesia (—6+20 mesh) 59.00 parts, dead-burned magnesia (65% through 200 mesh) 38.50 parts, sodium phospho-aluminate (ground with the 65% —200 mesh magnesia fraction) 1.00 part, trisodium phosphate (also ground with a 65% —200 mesh magnesia) 0.50 part, sodium carbonate (also ground with the 65% —200 mesh fraction) 1.00 parts, all by weight. The dry mixture was tempered with just sufficient water to cause the material to cling together in a wet mass when compressed in the hands. Test cylinders 2 x 2 inches were prepared as above, and were dried at 265° F. for 24 hours, and compressive strength was determined at several temperatures with the following results:

| Test temperature: | Compressive strength, p. s. i. |
|---|---|
| 70° F | In excess of 2100 |
| 1000° F | 1190 |
| 2000° F | 490 |

The very fine state of division of the magnesia component of the bond noted hereinbefore facilitates the complete reaction thereof with the other components of the bond. With the primary constituents magnesia, alkali phospho-aluminate and phosphate, granular refractories as desired can be thus effectively bonded in a wide range.

Other modes of applying the principle of the invention may be employed, change being made as regards the details described, provided the features stated in any of the following claims or the equivalent of such be employed.

We therefore particularly point out and distinctly claim as our invention:

1. A cementitious material for the bonding of refractory particles and the like consisting essentially of finely divided dead-burned magnesia and about one-half to ten percent of sodium phospho-aluminate.

2. A cementitious material for the bonding of refractory particles and the like consisting essentially of finely divided dead-burned magnesia and about one-half to ten percent of sodium phospho-aluminate, said magnesia being in finely divided state with at least fifty percent thereof through 200 mesh.

3. A cementitious material for the bonding of refractory particles and the like consisting essentially of finely divided dead-burned magnesia, about one-half to ten percent of sodium phospho-aluminate, and about one-fourth to one and one-fourth percent of trisodium phosphate.

4. A cementitious material as set forth in claim 3 characterized in that said magnesia is finely ground with at least fifty percent thereof through 200 mesh.

5. A refractory bonding mixture consisting essentially of about 86.25–98.75% of dead-burned magnesia, 0.5–10% of sodium phospho-aluminate, 0.25–1.25% of trisodium orthophosphate, and 0.5–2.5% of sodium carbonate.

6. A refractory bonding mixture as set forth in claim 5 characterized further in that said magnesia is finely ground with about 65% thereof through 200 mesh.

7. A refractory composition consisting essentially of granular refractory material, finely divided dead-burned magnesia, and about one-half to ten percent sodium phospho-aluminate forming with said magnesia a bonding material for the granular refractory.

8. A refractory composition consisting essentially of granular refractory material, a mixture of finely divided dead-burned magnesia and about one-half to ten percent sodium phospho-aluminate forming a bonding material for the granular refractory, and about one-fourth to one and one-fourth percent of trisodium phosphate.

9. A refractory composition consisting essentially of granular refractory material intermixed with about 20 to 40% of a bonding material, said bonding material consisting essentially of finely divided dead-burned magnesia and about one-half to ten percent sodium phospho-aluminate.

10. A refractory composition as set forth in claim 9 characterized further in that said refractory material is granular magnesia.

11. A refractory composition consisting essentially of about 59% of granular magnesia, 38½% of finely divided dead-burned magnesia, 1% of sodium phospho-aluminate, ½% of trisodium phosphate, and 1% of sodium carbonate.

No references cited.